E. J. DEEGAN.
MECHANISM SUITABLE FOR USE AT OR AS PART OF A DAMPER REGULATING APPARATUS.
APPLICATION FILED OCT. 31, 1911.
Reissued Jan. 2, 1912. 13,346.
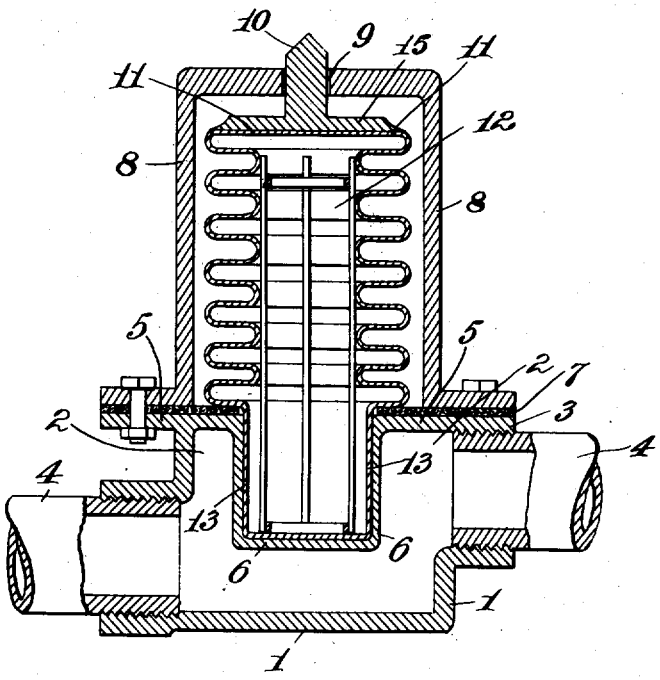
Attest:
Lila B. Warren
Josephine Smith
by
Inventor:
Edward J. Deegan,
H. G. Kenily Atty.

UNITED STATES PATENT OFFICE.

EDWARD J. DEEGAN, OF NEW YORK, N. Y.

MECHANISM SUITABLE FOR USE AT OR AS PART OF A DAMPER-REGULATING APPARATUS.

13,346. Specification of Reissued Letters Patent. Reissued Jan. 2, 1912.

Original No. 1,000,379, dated August 15, 1911, Serial No. 596,847. Application for reissue filed October 31, 1911. Serial No. 657,868.

*To all whom it may concern:*

Be it known that I, EDWARD J. DEEGAN, a citizen of the United States of America, residing in the city of New York, county and State of New York, have invented certain new and useful Improvements in Mechanism Suitable for Use at or as Part of a Damper-Regulating Apparatus, of which the following is a specification, reference being had to the accompanying drawing, forming part of the same.

My invention relates to an improved mechanism suitable for use as or as part of a damper regulating apparatus and particularly to that type of mechanism in which a convoluted metal tube is so employed that by the lengthening and shortening of that tube, consequent upon its heating or cooling, some regulating device may be lifted, depressed or otherwise moved to regulate a damper or other device. Such devices are frequently made of corrugated tubing which can readily lengthen or shorten. Many times they are charged with a volatile fluid whose expansion when heated or contraction when cooled will aid in the changing of the form of the tube to the desired extent. Heretofore such devices have been placed directly in the heating medium or where they would be touched by it in the ordinary flow. Sometimes they have been provided with parts adapted to be so placed that the said medium would touch and encompass the exterior face of such parts, but such arrangements are in some respects objectionable. First, if one regulator need repairs, its removal for that purpose deranges, perhaps, a whole system. Second, the action of the medium in direct contact with the wall of the tube or part tends to cause its disintegration and the device may not be as durable as it should, since, it is often found desirable to form it of material which will not have as great wear resisting qualities as the main conduits or containers of the heating medium.

To provide for the contingencies and conditions disclosed, I have devised my present mechanism, the paramount feature of which is a depending chamber extending into the heat containing structure, the wall of the structure being, in a degree, independent of that of the regulating apparatus, but so designed as to receive and hold, usually in close contact, some part of the expansible tube mechanism.

The drawing is a central vertical sectional view of a portion of a damper regulator embodying my invention. It is shown as connected to a pipe through which a heating medium—hot air, steam, vapor or hot water—is intended to pass.

1 indicates a casing of a chamber adapted to form part of a heating medium holder, here a conduit, and for that purpose provided with bosses, 3, threaded to receive fluid pipes, 4, one of which may constitute an inlet and the other an outlet. This casing is also provided with a bulb or chamber 6, extending into the space between its walls but closed against the exit of the heating medium. The casing is here shown as a part not integral with the pipes 4, but that independence is not a necessary feature though often convenient It is preferably provided with a plane upper diaphragm-like surface 5, of sufficient area to form a satisfactory seal for a hood 8 which may be bolted to it as shown, a gasket of packing 7 being preferably interposed.

12, is the extensible part of the device, shown as a corrugated or convoluted tube, closed at one end by a head 11 and at the other end by a bulb or chamber 13, so constructed as to fit closely within and preferably to make a continuous contact with the side and bottom walls of the depending bulb 6. Within the inclosure thus formed by the expansible tube and its head 11 and bulb 13, I usually place a sufficient quantity of alcohol or other volatile fluid, which when heated will assist in elongating the tube and to the head I secure an operating device, such for instance as the cap 15 provided with a projecting pin 10 which may be utilized to bear against a damper lever and (when lifted by the extension of tube 12) to operate that lever to change the position of the dampers.

The hood 8, which I prefer to employ (as it protects the tube from undesirable currents of air) is perforated at 9 to permit the extension through it of the pin 10, though in some cases, I may dispense with such hood 8.

The operation of the device is as follows:—Assuming that the casing 1 is connected with a holder for a heating fluid, (here a conduit for the passage of heating fluid from a furnace), and the pin 10 is in contact with the damper lever of such furnace, the relative position of the damper, the lever and the pin having been duly arranged. Then when the furnace heats the medium to a degree which is higher than that desired, the heating medium will impinge upon and surround the bulb 6 and raise its temperature. That increase temperature will be communicated to the collapsible tube through its bulb 13 and to the volatile liquid within. That liquid and the tube will expand, thereby increasing the length of the tube, raising the pin and operating the damper regulator to close the damper and reduce the furnace action, thus causing a reduction of temperature in the fluid medium, which is the result desired. Thereupon the parts will cool and return to their normal positions, as will the damper regulator and damper and it will be noticed that this has been accomplished without direct contact of the medium in the conduit, with the expansible tube so that if that medium should carry acids or gases which would corrode the tube, if in contact therewith, that objectionable action would be prevented. Again if any accident should happen to the tube the head 11, bulb 13, cap 15, or pin 10, those parts may be removed without opening the holder or conduit at all, or in any way interfering with the passage of the heating medium through it. It is thus apparent that if these devices were used at the respective radiators of a heating system, the regulating device of one radiator could readily be cut out without in any way interfering with the action of any other radiator, a result much to be desired.

The words damper regulator have been used in a broad sense to indicate any regulating device which might be operated by the lengthening of the expansible tube.

What I claim and desire to secure by Letters Patent of the United States is:—

1. A device of the character described comprising a damper regulator supporting casing having formed therein a fluid chamber and fluid pipe reception means, an expansible mechanism reception chamber depending into said fluid chamber formed in said casing, a pipe adapted for expansion having formed on its lower end, a supporting base adapted to engage said reception chamber in said casing and having its upper body portion formed into a plurality of convolutions, a cap having cast integrally therewith an actuating pin adapted to engage the extreme upper convolution in said pipe and a hood surrounding said expansible pipe provided with an aperture adapted to receive the pin on said cap.

2. A device of the character described including an expansible pipe for damper regulators having formed on its lower closed end a supporting base and in its upper body portion a plurality of convolutions, a regulator supporting casing having formed therein a fluid chamber and fluid pipe reception means, an expansible pipe reception chamber formed in said casing and depending into said fluid chamber adapted to receive the lower closed end of said expansible pipe, a cap mounted on the upper convolution of said expansible pipe having cast integrally therewith an actuating pin, a hood engaging said casing and adapted to surround the convoluted portion of said expansible pipe, the lower closed end of said expansible pipe being so arranged with relation to the reception chamber as to form a supporting base or wall for the upper convoluted portion of said pipe.

3. A device of the character described, comprising an expansible tube, a fluid chamber with fluid pipe reception means, a chamber projecting into said fluid chamber substantially as set forth, and provided with a closed wall interposed between the fluid chamber and the interior of the chamber projecting into the fluid chamber, whereby it will be surrounded and acted upon by the fluid entering the fluid chamber, a hollow extension projecting from the expansible tube and entering and fitting closely within the chamber projecting into the fluid chamber, but removable therefrom as described, without opening the pipe or its chamber, and means connected with said expansible tube for operating a regulating device, all substantially as set forth.

4. A device of the character described, comprising an expansible tube, a fluid chamber with fluid pipe reception means, a chamber projecting into said fluid chamber substantially as set forth, and provided with a closed wall interposed between the fluid chamber and the interior of the chamber projecting into the fluid chamber, whereby it will be surrounded and acted upon by the fluid entering the fluid chamber, a hollow extension projecting from the expansible tube and entering and fitting closely within the chamber projecting into the fluid chamber, but removable therefrom, as described, without opening the pipe or its chamber, a cap closing the outer end of the expansible tube and provided with a pin extending therefrom all substantially as set forth.

5. A device of the character described, comprising an expansible tube, a fluid chamber with fluid pipe reception means, a chamber projecting into said fluid chamber substantially as set forth, and provided with a closed wall interposed between the fluid chamber and the interior of the chamber projecting into the fluid chamber, whereby it will be surrounded and acted upon by the fluid entering the fluid chamber, a hollow extension projecting from the expansible tube and entering and fitting closely within the chamber projecting into the fluid chamber, but removable therefrom, as described, without opening the pipe or its chamber, a cap closing the outer end of the expansible tube and provided with a pin extending therefrom, and a casing apertured for the passage of said pin, and surrounding said expansible tube all susbtantially as set forth.

6. A fluid conveying pipe, provided with a fluid chamber therein, closed at the sides, a chamber projecting into said fluid chamber substantially as set forth, and provided with a closed wall interposed between the fluid chamber and the interior of the chamber projecting into the fluid chamber, whereby it will be surrounded and acted upon by the fluid entering the fluid chamber, an expansible tube, a hollow extension projecting from the expansible tube and entering and fitting closely within the chamber projecting into the fluid chamber, but removable therefrom as described, without opening the pipe or its chamber, and means connected with said expansible tube for operating a regulating device, all substantially as set forth.

7. A fluid holding chamber, a chamber projecting into said fluid chamber, substantially as set forth, and provided with a closed wall interposed between the fluid holding chamber and the interior of the chamber projecting into the fluid chamber, whereby the projecting chamber will be surrounded and acted upon by fluid in the fluid holding chamber an expansible tube, a hollow extension projecting from the expansible tube and entering and fitting closely within the chamber projecting into the fluid holding chamber, but removable from said projecting chamber as described, without opening said fluid holding chamber, and means connected with said expansible tube for operating a regulating device, all substantially as set forth.

EDWARD J. DEEGAN.

Witnesses:

LILA B. WARREN,

A. G. N. VERMILYA.